(12) United States Patent
An

(10) Patent No.: US 7,951,027 B2
(45) Date of Patent: May 31, 2011

(54) CVT USING A BELT AND DRIVING METHOD

(76) Inventor: Young Shin An, Changwon (KR)

(*) Notice: Subject to any disclaimer, the term of this patent is extended or adjusted under 35 U.S.C. 154(b) by 321 days.

(21) Appl. No.: 12/161,798

(22) PCT Filed: Feb. 28, 2007

(86) PCT No.: PCT/KR2007/001021
§ 371 (c)(1),
(2), (4) Date: Jul. 23, 2008

(87) PCT Pub. No.: WO2007/100210
PCT Pub. Date: Sep. 7, 2007

(65) Prior Publication Data
US 2010/0222166 A1    Sep. 2, 2010

(30) Foreign Application Priority Data

Feb. 28, 2006 (KR) .................. 10-2006-0019639

(51) Int. Cl.
F16H 55/00 (2006.01)
F16H 9/02 (2006.01)
F16H 59/00 (2006.01)
F16H 61/00 (2006.01)
F16H 63/00 (2006.01)
F16H 55/54 (2006.01)
F16H 9/10 (2006.01)

(52) U.S. Cl. ............. 474/47; 474/49; 474/51; 474/52; 474/54

(58) Field of Classification Search .......... 474/47–57
See application file for complete search history.

(56) References Cited

U.S. PATENT DOCUMENTS

| 36,087 | A | * | 8/1862 | Harfield | 474/49 |
| 134,061 | A | * | 12/1872 | Hummer et al. | 474/49 |
| 137,352 | A | * | 4/1873 | Fales | 474/53 |
| 178,029 | A | * | 5/1876 | Shaklee et al. | 474/54 |
| 227,358 | A | * | 5/1880 | Hill et al. | 474/56 |
| 251,610 | A | * | 12/1881 | Lewis | 474/49 |
| 289,367 | A | * | 11/1883 | Osborne | 474/54 |
| 359,098 | A | * | 3/1887 | Rose | 474/55 |
| 360,920 | A | * | 4/1887 | Scott | 474/55 |

(Continued)

FOREIGN PATENT DOCUMENTS

JP    01-299355    4/1989

(Continued)

*Primary Examiner* — Michael R Mansen
*Assistant Examiner* — Henry Liu
(74) *Attorney, Agent, or Firm* — Park & Associates IP Law, P.C.

(57) ABSTRACT

The present invention relates to a continuously variable transmission using a belt which comprises: a driving portion including a main cylinder having a space in which oil can be filled and operating as a pulley, a plurality of subsidiary cylinders disposed at a circumferential surface of the main cylinder and expanding in the radial direction due to the centrifugal force produced by the rotation of the driving shaft, the subsidiary cylinders each being formed with belt grooves at the distal end for seating belts thereon; a driven portion having a structure identical to that of the driving portion, and disposed at a position spaced apart from the driving portion by a predetermined distance; belts seated on the belt grooves formed at the subsidiary cylinders of the driving portion and the belt grooves formed at the subsidiary cylinders of the driven portion, for transmitting the power of the driving portion to the driven portion.

9 Claims, 4 Drawing Sheets

U.S. PATENT DOCUMENTS

| | | | | |
|---|---|---|---|---|
| 443,561 A * | 12/1890 | Avery | | 474/53 |
| 459,848 A * | 9/1891 | Wetmore | | 191/63 |
| 633,426 A * | 9/1899 | Code et al. | | 474/53 |
| 671,895 A * | 4/1901 | Lyford | | 474/53 |
| 672,962 A * | 4/1901 | Seymour | | 474/53 |
| 724,449 A * | 4/1903 | Dumaresq | | 474/53 |
| 771,006 A * | 9/1904 | Giraud | | 474/53 |
| 869,168 A * | 10/1907 | Fisher | | 242/574.2 |
| 887,878 A * | 5/1908 | Tuttle | | 474/55 |
| 895,298 A * | 8/1908 | Pope | | 242/574.3 |
| 999,530 A * | 8/1911 | Staff et al. | | 474/53 |
| 1,160,414 A * | 11/1915 | Kelsey | | 474/53 |
| 1,181,476 A * | 5/1916 | Osborn | | 474/54 |
| 1,388,797 A * | 8/1921 | Buttress | | 474/55 |
| 1,440,462 A * | 1/1923 | Healey | | 474/53 |
| 1,523,241 A * | 1/1925 | Backman | | 474/53 |
| 2,645,946 A * | 7/1953 | Schleif | | 474/55 |
| 2,700,902 A * | 2/1955 | Sampietro | | 474/51 |
| 3,087,349 A * | 4/1963 | Herting | | 474/51 |
| 4,024,772 A * | 5/1977 | Kumm | | 474/51 |
| 4,030,373 A * | 6/1977 | Leonard | | 474/53 |
| 4,259,874 A * | 4/1981 | Guirriec | | 474/28 |
| 4,295,836 A * | 10/1981 | Kumm | | 474/51 |
| 4,409,862 A * | 10/1983 | Adkins | | 475/211 |
| 4,498,351 A * | 2/1985 | Ahoor | | 74/439 |
| 4,529,394 A * | 7/1985 | Ybern Miro | | 474/49 |
| 4,810,234 A * | 3/1989 | Kumm | | 474/49 |
| 4,878,883 A * | 11/1989 | Wheless | | 474/51 |
| 6,379,275 B1 * | 4/2002 | Serkh | | 474/49 |
| 6,458,054 B1 * | 10/2002 | Mimura | | 474/100 |
| 7,261,655 B2 * | 8/2007 | Vargas | | 474/49 |
| 2004/0198542 A1 * | 10/2004 | Fuerle | | 474/162 |
| 2005/0148416 A1 * | 7/2005 | Naude | | 474/49 |
| 2005/0288137 A1 * | 12/2005 | Vargas | | 474/47 |
| 2005/0288138 A1 * | 12/2005 | Smith | | 474/47 |

FOREIGN PATENT DOCUMENTS

| | | |
|---|---|---|
| KR | 1995-0013788 | 6/1995 |
| KR | 20-0309174 | 3/2003 |

* cited by examiner

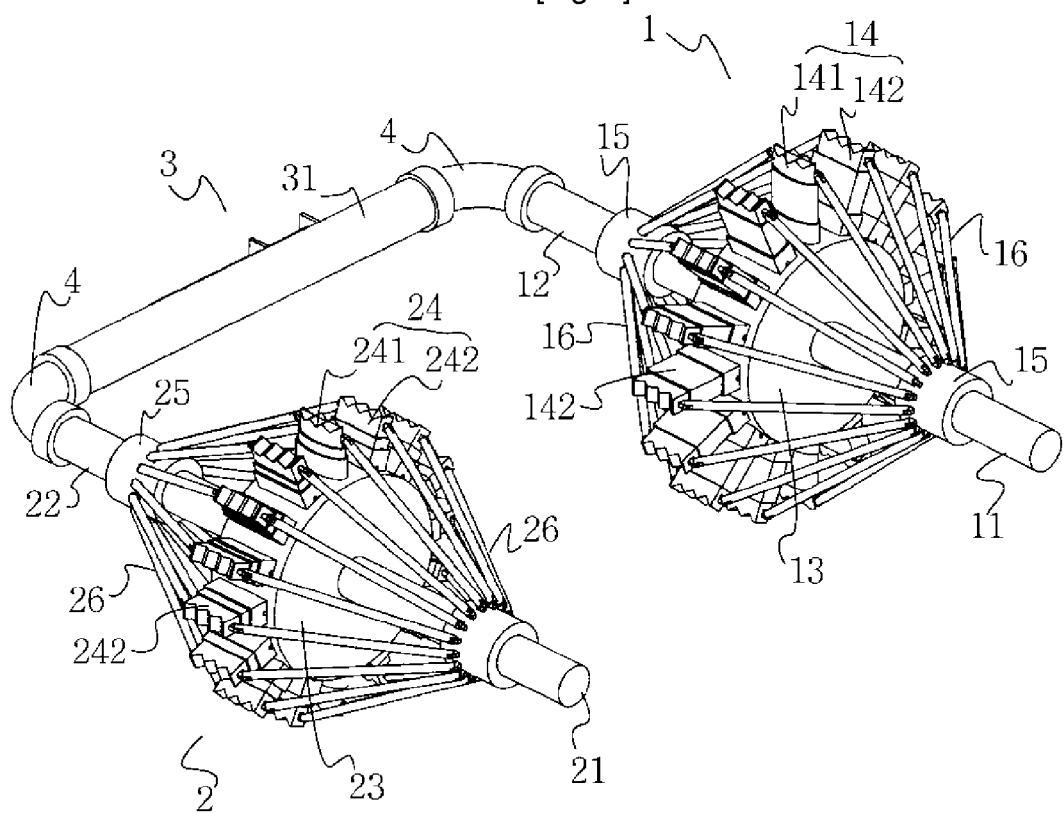
[Fig. 1]

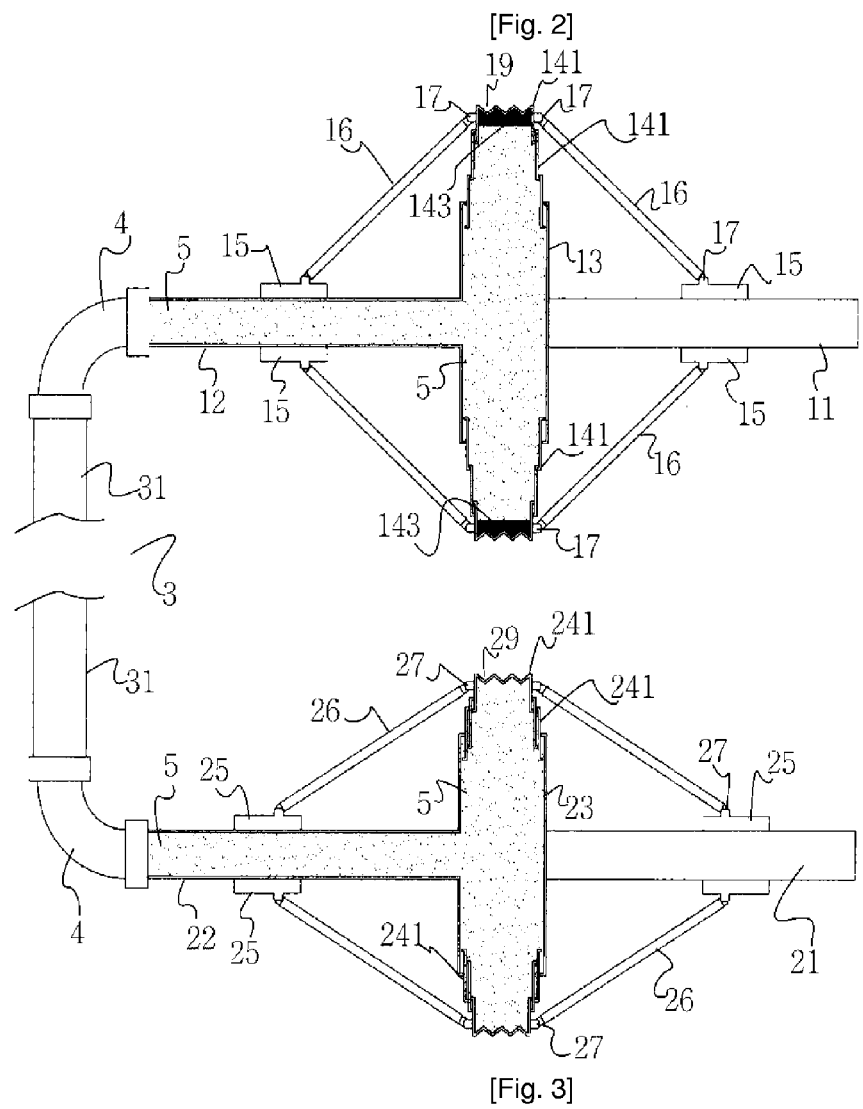
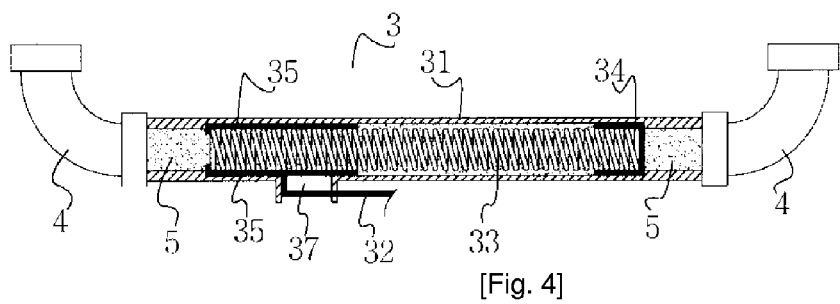
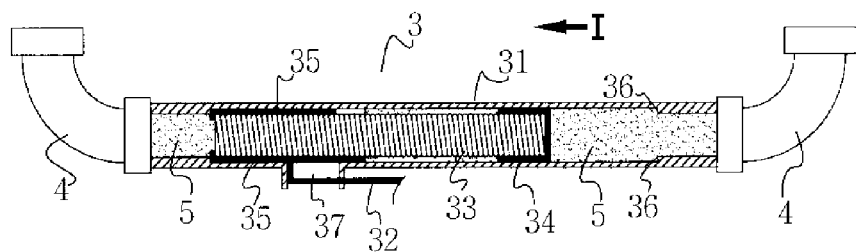

[Fig. 5]
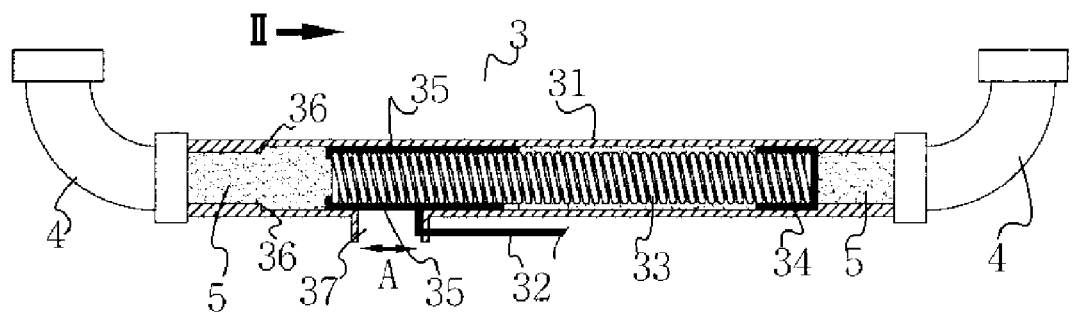
[Fig. 6]
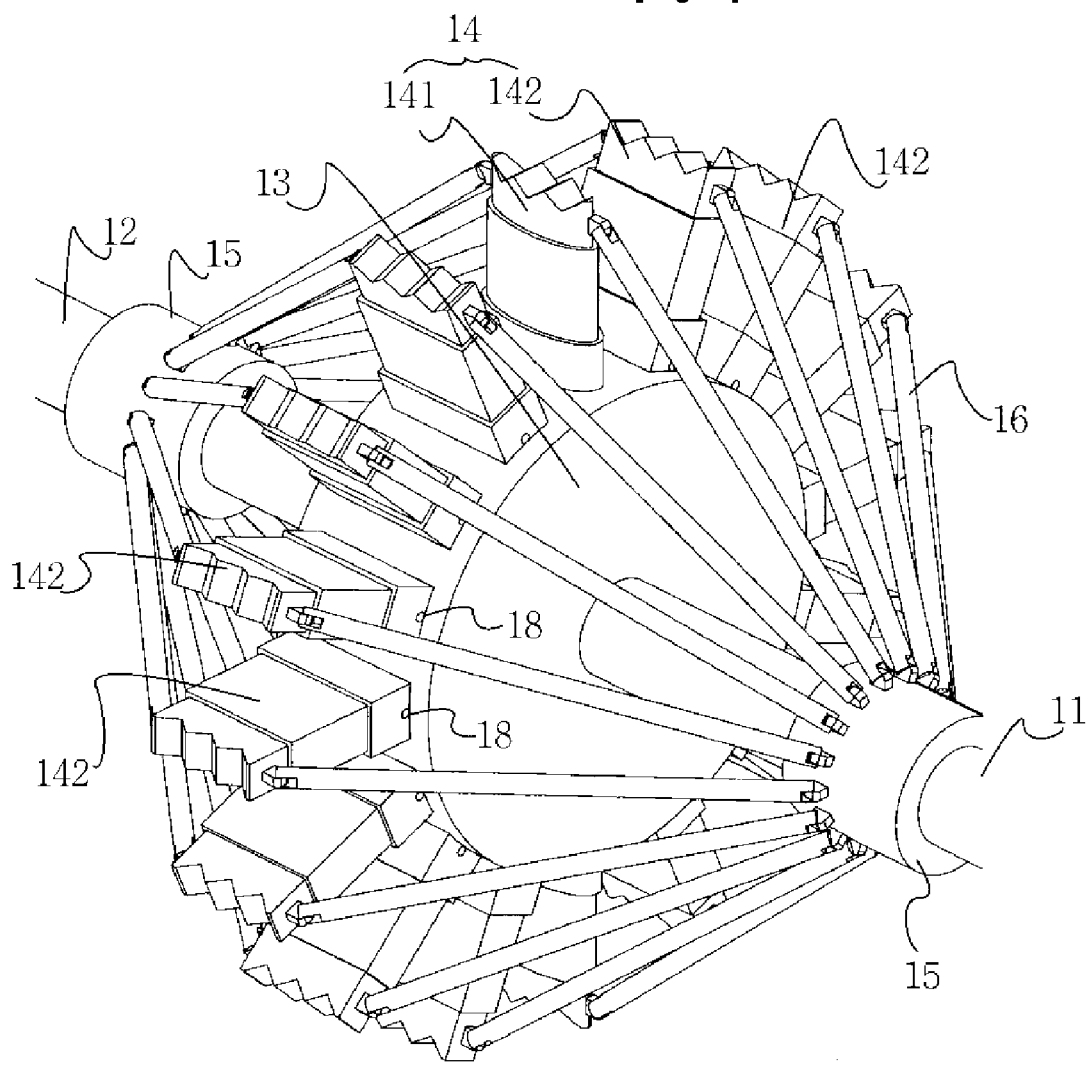

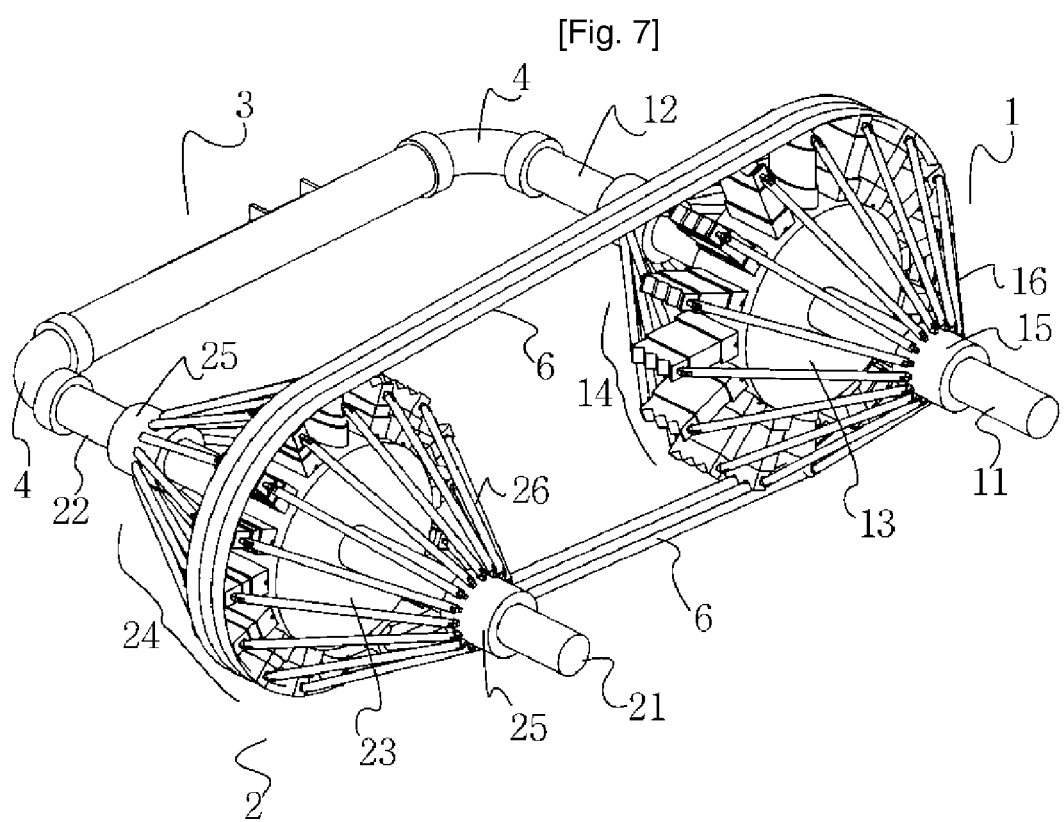
[Fig. 7]

CVT USING A BELT AND DRIVING METHOD

TECHNICAL FIELD

The present invention relates to a continuously variable transmission (CVT) using a belt, more particularly, to a CVT using a belt, in which power is transmitted by the belt disposed between a subsidiary cylinder of a driven portion and a main cylinder of a driving portion, which have a radial rotation body shape, and inverse proportional relation is formed between the subsidiary cylinder as a rotation body of the driven portion and the main cylinder as a rotation body of the driving portion due to the restricted length of the belt.

BACKGROUND ART

In general, a CVT is employed according to its uses in places where hoist, a conveyor for transporting articles, a winch, an elevator, an escalator and the like are installed in an automobile field and various industrial fields. However, the conventional CVT has entailed many problems in that its structure is relatively complex and its actual structure itself is configured to perform the transmission through several stages although it is called a CVT, so that the transmission is extremely restricted to thereby be incapable of performing the proper transmission according to use purposes, and the probability of occurrence of a failure increases during the use due to the complexity of the structure.

Meanwhile, an automatic transmission for an automobile also encounters several problems in that power loss is excessive and the probability of occurrence of a failure increases due to the use of a torque converter in place of a clutch, riding feeling is not good due to the impact occurring during the transmission performed through several stages, consumption of the fuel is high due to unnecessary loss of the power, manufacturing cost is excessive due to numerous parts, maintenance and repair are very difficult when a fault occurs and the burden of the maintenance cost increases severely. Especially, such an automatic transmission has problems in that its structure is very complicated and its weight becomes very heavy due to numerous parts to thereby increase the loss of fuel, and the like.

DISCLOSURE OF INVENTION

Technical Problem

Accordingly, the present invention has been made to solve such conventional problems occurring in the prior art, and it is an object of the present invention to provide a CVT, which is excellent in driving feeling because it is constructed to vary its diameter not in step by step but progressively, according to the variation of the centrifugal force produced due to the speed, is excellent in riding feeling because there is no impact produced from the transmission, and is capable of enduring the heavy weight because oil is supplied to the cylinder side with a diameter increased by the centrifugal force, by being constructed such that the power is transmitted by means of the belt provided between a driving portion having a diameter changing freely due to the centrifugal force and a driven portion to be inversely proportional to the driving portion.

Technical Solution

To achieve the above object, the present invention provides a continuously variable transmission comprising:

a driving portion including a main cylinder having an inner space in which oil can be filled and operating as a pulley rotatable about a hollow tube type rotation shaft which is disposed at one side of the main cylinder to have a passage for passing the oil there-through, and a driving shaft which is disposed at the other side of the main cylinder to allow the power to be inputted therethrough, the hollow tube type rotation shaft and the driving shaft serving as a central shaft, a plurality of subsidiary cylinders disposed at a circumferential surface of the main cylinder and expanding in the radial direction the centrifugal force produced by rotation of the driving shaft, the subsidiary cylinders each having belt grooves at the distal end for seating belts thereon, and two linear bushings engaged with each other by means of links 16 disposed at both sides of the subsidiary cylinder 14 and configured to move linearly on the driving shaft 11 and the rotation shaft;

a driven portion having a structure identical to that of the driving portion, and disposed at a position spaced apart from the driving portion by a predetermined distance;

belts seated on the belt grooves formed at the subsidiary cylinders of the driving portion 1 and on the belt grooves formed at the subsidiary cylinders of the driven portion, for transmitting the power of the driving portion to the driven portion; and an oil control portion connected between the rotation shaft of the driving portion and the rotation shaft of the driven portion, for controlling the oil filled in the main cylinder of the driving portion and the oil filled in the driven portion.

Advantageous Effects

Therefore, according to the present invention, it is expected that the lifespan of the engine would be extended because it is possible to maintain the agreeability of driving and relatively uniform rotation of the engine as the transmission is carried out progressively to thereby remove the impact of the transmission.

In addition, it is possible to seat a plurality of belts on a plurality of belt grooves, so that it is expected to be applicable to diverse vehicles by means of the relatively large power transmission and wide range of transmission.

BRIEF DESCRIPTION OF THE DRAWINGS

FIG. 1 is a perspective view showing a whole construction of a CVT according to the present invention;

FIG. 2 is a partial cross-sectional view of subsidiary hydraulic cylinders, which are filled with oil, of the driven portion and the driving portion, taken along a horizontal line;

FIG. 3 is a partial cross-sectional view showing an inner portion of an oil control portion of the CVT according to the present invention;

FIG. 4 is a cross-sectional view illustratively showing the operation of the oil control portion of the CVT according to the present invention;

FIG. 5 is a cross-sectional view illustratively showing the control of elastic power of a compression spring, which constructs the oil control portion of the CVT according to the present invention;

FIG. 6 is a perspective view showing the engagement relation of a main cylinder and a subsidiary cylinder according to the present invention; and FIG. 7 is an illustrative view showing the operation of the belt driving in the present invention.

MODE FOR THE INVENTION

Hereinafter, the preferred embodiment of the CVT with a structure described above according to the present invention will be described in detail with reference to the appended drawings.

FIG. 1 is a perspective view showing an entire construction of a CVT according to the present invention, and FIG. 2 is a partial cross-sectional view of subsidiary hydraulic cylinders, which are filled with oil, of the driven portion and the driving portion, taken along a horizontal line.

In the present embodiment, the CVT of the present invention comprises a cylindrical main cylinder 13 having a space at the inside to be filled with the oil 5, and a driving shaft 11 is installed at the center of the cylinder for inputting the power.

Also, a hollow pipe type rotation shaft 12 is installed at the other side of the center of the main cylinder 13 to construct a passage for the oil 5.

Accordingly, the main cylinder 13 provided with the driving shaft 11 at one side and the rotation shaft 12 at the opposite side is constructed to be rotated by the power inputted to the driving shaft 11.

Furthermore, a plurality of subsidiary cylinders 14 are installed at the peripheral surface of the main cylinder 13 so that they can reciprocate in the radial direction due to the centrifugal force produced from the rotation of the driving shaft 11, and additional secondary or tertiary stage cylinder 14 can be further installed at the circumferential surface as multi-stages according to the strength of the centrifugal force.

As shown in FIG. 2, a balance weight 143 is installed at the inside of the subsidiary cylinder 14 at the driving portion 1 so that the centrifugal force can be applied effectively.

Also, a plurality of belt groves 19 are formed on a distal end of the subsidiary cylinder 14 so that the belt 6 can be stably seated.

Linear bushings 15 are also respectively installed at the driving shaft 11 and the rotation shaft 12, each of which is engaged with each other by a link 16 installed at both sides of the subsidiary cylinder 14.

A hinge 17 is formed at respective both ends of the link 16.

Accordingly, when the subsidiary cylinder 14 is expanded in the radial direction by the centrifugal force, the links 16 engaged at both sides of the subsidiary cylinder 14 by means of the hinge 17 become to be widened in the vertical direction of the rotation shaft 12 or the driving shaft 11, and the linear bushing 15 engaged at the distal end of the other side of the link 16 by means of the hinge 17 is moved linearly to the near side of the main cylinder 13 on the driving shaft 11 and the rotation shaft 12.

The linear bushing 15 and the link 16 are installed to prevent the separate expansion of the subsidiary cylinders with separate length, because the centrifugal force was produced at some particular cylinders of the plurality of subsidiary cylinders 14, when the subsidiary cylinders 14 are expanded outward in the radial direction by the centrifugal force. In this regard, they functions to expand the subsidiary cylinders to predetermined lengths by means of the predetermined force to thereby define an accurate circular form.

The driving portion 1 has the above described structure by means of the direct transmission of the power, and a driven portion 2 having a structure identical to that of the driving portion 1 is installed at a place spaced apart from the driving portion 1 by a predetermined distance, and a belt 6 is seated between the belt grooves 19 of the subsidiary cylinder 14 of the driving portion 1 and the belt grooves 29 of the subsidiary cylinders 24 of the driven portion 2, so that the power can be transmitted to the driven portion 2.

As shown in FIGS. 1 and 2, as a rule, the driven portion 2 is constructed to include links 26, hinges 27, linear bushings 25, subsidiary cylinders 24, main cylinders 23, and the like, except the balance weight 143 installed at the inside of the subsidiary cylinder 14 of the driving portion 1.

This is to make the diameter of the subsidiary cylinder 24 to be determined by the elastic returning power of a compression spring 33 installed at the inside of an oil control portion 3 and the diameter of the rotation body is not determined by the centrifugal force.

In the present embodiment, a plurality of belt grooves 19, 29 are formed to seat a plurality of belts 6 so that relatively big power can be transmitted without any problem, and V-shaped belts are used to obtain big frictional force.

The shape of the belt grooves 19, 29 can be varied a little according to the conditions of the driving means.

Moreover, the rotation shaft 12 of the driving portion 1 and the rotation shaft 22 of the driven portion 2 are respectively provided with a joint 4, and an oil 5 control portion 3 is installed between the rotation shafts 12, 22 by means of the joints 4 to control the volume of the oil filled in the inside space of the driving portion 1 and the driven portion 2.

FIG. 3 is a partial cross-sectional view showing the inside of the oil control portion of the present invention. As shown in FIG. 1, the oil control portion 3 is constructed that a securing pipe 31, which is a body of the oil control portion 3, is engaged at both ends thereof with the rotation shaft 12 of the driving portion 1 and the rotation shaft 22 of the driven portion 2 by means of joints 4.

Herein, the oil control portion 3 is constructed that the inside diameter of the center portion of the securing pipe 31 is bigger than the inside diameter of the distal end of the securing pipe 31, so that engaging jaw portions 36 are formed at both distal ends of the securing pipe 31 according to the change of the thickness of the securing pipe 31, and a square elasticity control groove portion 37 penetrated into a predetermined length in the longitudinal direction, is formed at the side portion of the oil control portion 3.

Furthermore, an elasticity control ring 35 and a compression ring 34 are installed at the inside of the securing pipe 31 so that they cannot be moved to both sides by the engaging jaw portion, and an additional compression spring 33 is elastically installed between the elasticity control ring 35 and the compression ring 34.

The above described elasticity control ring 35 is formed with a through-hole at the center so that the oil 5 can freely flow reciprocally to the driving portion 1, and the compression ring 34 is constructed as fitting shape into the inside diameter of the securing pipe 31 so that the oil 5 cannot flow reciprocally to the driven portion 2.

In addition, the elasticity control ring 35 is provided at the side with a control lever 32 formed outward from the elasticity control portion 3 through the elasticity control groove portion 37.

The operation of the elasticity control ring 35 and the control lever 32 will be described below in connection with FIG. 5.

The securing pipe 31 is a securing shaft incapable of rotating, and the rotation shaft 22 of the driving portion 1 and the driven portion 2 is a shaft capable of rotating. As a result, as regard to the joint 4 for connecting the securing shaft and the rotation shaft, a joint 4 conforming to the special circumstances should be employed. In this regard, several joints 4 have been developed to conform to the special circumstances as described in connection with the present invention.

Accordingly, it will be represented as a joint 4 without using any other terms about it.

FIG. 4 is a cross-sectional view illustratively showing the operation of the oil control portion of the present invention. As shown in FIG. 4, while the compression spring 33 is not affected from the oil 5 supplied from the driving portion 1, the compression ring 34 is pushed toward the direction noted by the arrow I by the pressure of the oil 5 supplied from the driven portion 2, and the compression spring 33 installed at the inside of the securing pipe 31 is compressed by the compression ring 34 pushed toward the driving portion 1 by the pressure of oil 5, and the oil 5 from the driven portion 2 is filled in the inside of the securing pipe 31 as large a volume as that of the compressed volume of the compression spring 33.

In addition, when the centrifugal force in the driving portion 1 becomes small, the compression spring 34 is pushed toward a direction opposite to the direction of the arrow I by means of the returning power of the compressed compression spring 33, and the compression ring 33 is moved to the engaging jaw 36 formed at the inside diameter of the driven portion 2 in the securing pipe 31.

Instantly, the oil 5 filled in the inside of the securing pipe 31 is moved toward the driven portion 2.

FIG. 5 is an illustrative cross-sectional view showing the control of the elastic power of the compression spring constructing the oil control portion of the present invention. As shown in FIG. 5, when the control lever 32 is pulled toward the direction of the arrow II, and the elasticity control ring 35 installed at the inside of the securing pipe 31 is moved in the direction identical to that of the control lever 32, and the compression spring 33 elastically supported at the inside of the securing pipe 31 becomes to be compressed.

Herein, since the elasticity control ring 35 has a hollow shape, it does not affect the oil 5 filled in the securing pipe 31 and compresses only the compression spring 33.

Accordingly, since the movement change of the oil 5 at the driven portion 2 becomes smaller as the elastic returning power is reduced due to the compressed setting of the compression spring 33, the minimization of the diameter of the rotation body at the driven portion 2 is prevented by the relation between the movement of the oil 5 shown in FIG. 7 and the driven portion 2, so that it is possible to carry out the continuous low stage driving.

As shown in FIG. 3, since the movement range of the elasticity control ring 35 is restricted to A, the oil 5 at the inside is not flowed out, and it will be preferable to be a packing made of synthetic resin material to prevent the flow out of the oil 5.

When the other side of the control lever 32 is constructed to be controlled by a switch installed at the driver's seat, it will be possible to set the elasticity of the compression spring 33 to conform to the driving circumstances.

The securing pipe 31 of the oil control portion 3 is formed with an oil injection opening and a discharge opening for discharging the air at the inside, however, they are not shown in the present drawings separately for the purpose of understanding and simplification of the drawings.

The interrelation between the oil control portion 3 and the centrifugal force will be hereinafter described in detail in connection with FIG. 7.

FIG. 6 is a partial perspective view showing the engagement relation between the main cylinder and the subsidiary cylinder, in which a plurality of subsidiary cylinders 14 are installed at the circumferential surface of the main cylinder 13 of the driving portion 1 and the driven portion 2.

Also, elliptical hydraulic subsidiary cylinders 141 are disposed in both side directions and a plurality of rectangular non-hydraulic subsidiary cylinders 142 are disposed on the circumferential surface in the circumferential direction with an uniform interval, so that maximum number of the subsidiary cylinders 14 can be disposed on the circumferential surface of the main cylinder 13.

In this regard, the hydraulic subsidiary cylinder 141 is constructed so that the oil 5 can be filled therein and endure heavy load, and the non-hydraulic subsidiary cylinder 142 is formed with a through-hole 18 at the lower side for making the air freely flow in and out of the subsidiary cylinder, so that it can assist the non-hydraulic cylinder 142.

FIG. 7 is an illustrative view showing the operation of the belt driving according to the present invention, in which the power of the engine is transmitted to the driving shaft 11, and the main cylinder 13 becomes to rotate by the rotation of the driving shaft 11 with regard to the driving shaft 11 and the rotation shaft 12.

The plurality of subsidiary cylinders 14 installed at the circumferential surface of the main cylinder 13 are expanded in the radial direction to form a rotation body by the centrifugal force produced by the rotation.

With regard to the subsidiary cylinder 14, secondary through tertiary stage cylinders 14 can be further expanded outward according to the strength of the centrifugal force, and the expanded subsidiary cylinders 14 form a rotation body having an increased diameter as the centrifugal force becomes stronger.

The rotation body functions as a pulley for the driving portion 1.

The driven portion 2 is constructed to have an identical structure to that of the driving portion 1 at a place spaced apart from the driving portion 1, and the cylinders 24 of the driven portion 2 form the rotation body to thereby function as a pulley for the driven portion 2.

In the present embodiment of the present invention, the belt 6 is installed between the belt grooves 19, 29 formed at the distal ends of respective subsidiary cylinders 14, 24 of the driving portion 1 and the driven portion 2, to thereby transmit the power of the driving portion 1 to the driven portion 2, and the inputted power is outputted from the driven shaft 21 of the driven portion 2.

As the driving portion 1 produces stronger centrifugal force to thereby form a rotation body having a larger diameter, since the length of the belt 6 is restricted, the driven portion 2 forms a rotation body of smaller diameter in inverse proportion as the diameter of a rotation body of the driving portion 1.

Accordingly, when the diameter of the rotation body of the driven portion 2 becomes smaller, the oil 5 filled in the space in proportion as the reduced volume is moved into the securing pipe 31 of the oil control portion 3 shown in FIG. 3, along the rotation shaft 22 connected to the driven portion 2, to thereby push the compression ring 34 installed at the inside of the securing pipe 31 of the oil control portion 3 by means of the pressure of the oil.

Then, the compression ring 34 pushed to the inside of the oil control portion 3 by the pressure of oil compresses the compression spring 33 to thereby make the oil 5 filled at the inside be flown into the inside space of the hydraulic subsidiary cylinder 141 expanded from the main cylinder 13 through the rotation shaft 12 of the driving portion 1 so that the inside space of the hydraulic subsidiary cylinder 141 is filled with the oil 5.

When the centrifugal force becomes relatively small, the elastic returning power of the compression spring 33 compressed in the securing pipe 31 of the oil control portion 3 becomes bigger than the centrifugal force, so that the compression spring 33 returning to its original state pushes the compression ring 34 toward the driven portion 2, and the oil 5 in the driven portion 2 again pushes it toward the main cylinder 23 at the driven portion 2, and the hydraulic subsidiary cylinder 241 expands from the main cylinder 23 as large as the volume of the incoming oil 5 to thereby form a rotation body having an increased diameter.

As the diameter of the rotation body at the driven portion 2 becomes bigger, the diameter of the rotation body at the driving portion 1 becomes relatively smaller.

If the number of the subsidiary cylinders 14, 24 installed at the main cylinders 13, 23 of the driving portion 1 and the driven portion 2 becomes numerous, they form an approximately round shaped rotation body, so that it can be more smoothly rotated by the belt 6. However, the number of the subsidiary cylinders is preferable to be selected according to the manufacturing cost and the size of the main cylinders 13, 23.

As described above, the interrelation between the diameters of the rotation body of the driving portion 1 and the driven portion 2 is accomplished in progressive, the driving can be performed without any impact of the transmission.

INDUSTRIAL APPLICABILITY

As described above, according to the present invention, it is expected that the lifespan of the engine can be extended because it is possible to maintain the agreeability of driving and relatively uniform rotation of the engine as the transmission is carried out in progressive to thereby remove the impact of the transmission.

In addition, it is possible to install a plurality of belts at the plurality of belt grooves, so it is expected to be applicable to diverse vehicles by means of the relatively large power transmission and wide range of transmission.

The invention claimed is:

1. A continuously variable transmission comprising:
a driving portion (1) including a main cylinder (13) having an inner space in which oil (5) can be filled and operating as a pulley rotatable about a hollow tube type rotation shaft (12) which is disposed at one side of the main cylinder (13) to have a passage for passing the oil (5) there-through, and a driving shaft (11) which is disposed at the other side of the main cylinder (13) to allow the power to be inputted there-through, the hollow tube type rotation shaft (12) and the driving shaft (11) serving as a central shaft, a plurality of subsidiary cylinders (14) disposed at a circumferential surface of the main cylinder (13) and expanding in the radial direction by centrifugal force produced by rotation of the driving shaft (11), the subsidiary cylinders (14) each having belt grooves (19) at the distal end for seating at least one belt (6) thereon, and two linear bushings (15) engaged with each other by means of links (16) disposed at both sides of the subsidiary cylinders (14) and configured to move linearly on the driving shaft (11) and the rotation shaft (12);
a driven portion (2) having a structure identical to that of the driving portion (1), and disposed at a position spaced apart from the driving portion (1) by a predetermined distance;
belts (6) seated on the belt grooves (19) formed at the subsidiary cylinders (14) of the driving portion (1) and on the belt grooves (29) formed at the subsidiary cylinders (24) of the driven portion (2), for transmitting the power of the driving portion (1) to the driven portion (2); and an oil control portion (3) connected between the rotation shaft (12) of the driving portion (1) and the rotation shaft (22) of the driven portion (2), for controlling the oil (5) filled in the main cylinder (13) of the driving portion (1) and the oil (5) filled in the driven portion (2);
wherein the subsidiary cylinders (14) disposed at the circumferential surface of the main cylinder (13) include hydraulic type subsidiary cylinders (141) configured to radially expand by means of the pressure of oil filled in an inner space thereof, and non-hydraulic type subsidiary cylinders (142), each of which has a through-hole (18) for venting air there-through.

2. The continuously variable transmission according to claim 1, wherein a balance weight (143) is provided at a distal end of the subsidiary cylinder (14) of the driving portion (1) for increasing the centrifugal force produced from the driving shaft (11).

3. The continuously variable transmission according to claim 1, wherein the belt grooves (19) formed at the subsidiary cylinder (14) is plural in number so that a plurality of belts (6) can be seated thereon.

4. The continuously variable transmission according to claim 1, wherein the whole subsidiary cylinders (14), (24) are configured to radially expand from the main cylinders (13), (23) by identical lengths by the concurrent application of force by means of the links (16), (26) and the linear bushings (15), (25) engaged thereto.

5. The continuously variable transmission according to claim 1, wherein the oil control portion (3) can control the oil (5) filled in the driving portion (1) and the driven portion (2) by means of a compression spring (33) disposed at an inside area thereof and a compression ring (34) disposed between the driven portion (2) and the compression spring (33).

6. The continuously variable transmission according to claim 5, wherein the elasticity of the compression spring (33) is controllable by an elasticity control ring (35) and a control lever (32).

7. A continuously variable transmission comprising:
a driving portion (1) and a driven portion (2), wherein the driving portion (1) is rotated about a driving shaft (11) rotating by means of direct transmission of power, and a rotation shaft (12) includes a passage at the inside, through which oil (5) can be flowed in and out, the driving shaft (11) and the rotation shaft (12) functioning as a central shaft,
wherein the driving portion (1) has a main cylinder (13) with a plurality of subsidiary cylinders (14) attached thereto at a circumferential surface of the a main cylinder, the subsidiary cylinders are radially expandable by centrifugal force produced from the rotation of the driving shaft (11),
wherein the driven portion (2) has a structure identical to that of the driving portion (1) and is disposed at a place spaced apart from the driving portion (1) by a predetermined distance, and the subsidiary cylinders (24) of the driven portion (2) are radially expandable to form a rotation body of a substantially circular shape, the driven portion (2) functioning as a pulley with at least one belt (6) engaged between the subsidiary cylinders of the driving portion (1) and the driven portion (2),
wherein the oil (5) filled in the driving portion (1) and the driven portion (2) can be controlled by a compression spring (33) and a compression ring (34) disposed in a securing pipe (31) of an oil control portion (3), the securing pipe (31) engaged between the rotation shaft (12) of the driving portion (1) and a rotation shaft (22) of the driven shaft (2).

8. The continuously variable transmission according to claim 7, wherein the diameters of the subsidiary cylinders (14) of the driving portion (1) and the subsidiary cylinders (24) of the driven portion (2), are continuously varied according to the centrifugal force produced from the rotation of the driving shaft (11) and are in inversely proportional relation with each other in diameter due to the restricted length of the belt (6).

9. The continuously variable transmission according to claim 7, wherein the subsidiary cylinders (14) disposed at the circumferential surface of the main cylinder (13) include hydraulic type subsidiary cylinders (141), and non-hydraulic type subsidiary cylinders (142).

* * * * *